(12) United States Patent
Kuba

(10) Patent No.: US 6,840,685 B1
(45) Date of Patent: Jan. 11, 2005

(54) OPTICAL MODULE AND CONNECTING CONSTRUCTION FOR OPTICAL MODULE

(75) Inventor: Yutaka Kuba, Kizu-cho (JP)

(73) Assignee: Kyocera Corporation, Kyoto (JP)

( * ) Notice: Subject to any disclaimer, the term of this patent is extended or adjusted under 35 U.S.C. 154(b) by 63 days.

(21) Appl. No.: 09/605,227

(22) Filed: Jun. 28, 2000

(30) Foreign Application Priority Data

Jun. 29, 1999 (JP) .......................................... 11-183264

(51) Int. Cl.[7] .................................................. G02B 6/36
(52) U.S. Cl. ............................ 385/88; 385/89; 385/92; 385/94
(58) Field of Search ........................... 385/88, 89, 92, 385/94, 56, 53

(56) References Cited

U.S. PATENT DOCUMENTS

| | | | | |
|---|---|---|---|---|
| 3,963,920 A | * | 6/1976 | Palmer | 250/239 |
| 4,466,696 A | * | 8/1984 | Carney | 385/49 |
| 5,432,630 A | | 7/1995 | Lebby et al. | |
| 5,615,292 A | * | 3/1997 | Beckwith | 385/89 |
| 5,715,338 A | * | 2/1998 | Sjolinder et al. | 385/14 |
| 5,748,822 A | * | 5/1998 | Miura et al. | 385/90 |
| 5,879,173 A | * | 3/1999 | Poplawski et al. | 385/92 |
| 6,222,665 B1 | * | 4/2001 | Neuner et al. | 359/237 |
| 6,227,720 B1 | * | 5/2001 | Isaksson | 385/59 |
| 6,299,362 B1 | * | 10/2001 | Gilliland et al. | 385/92 |

* cited by examiner

*Primary Examiner*—Rodney Bovernick
*Assistant Examiner*—Sung Pak
(74) *Attorney, Agent, or Firm*—Hogan & Hartson LLP

(57) ABSTRACT

An optical module includes a flat substrate, an electric connection terminal provided on the substrate, an optical element provided on the substrate, the optical element being connected with the electric connection terminal, and one end of a slender light transmitted fixed on the substrate and optically coupled with the optical element. The electric connection terminal is connectable with an external connector. The connector (or socket) is first mounted on an electric circuit board by reflow soldering or the like, and then the optical module having the slender light transmitter (or optical fiber) is electrically connected with the connector.

24 Claims, 6 Drawing Sheets

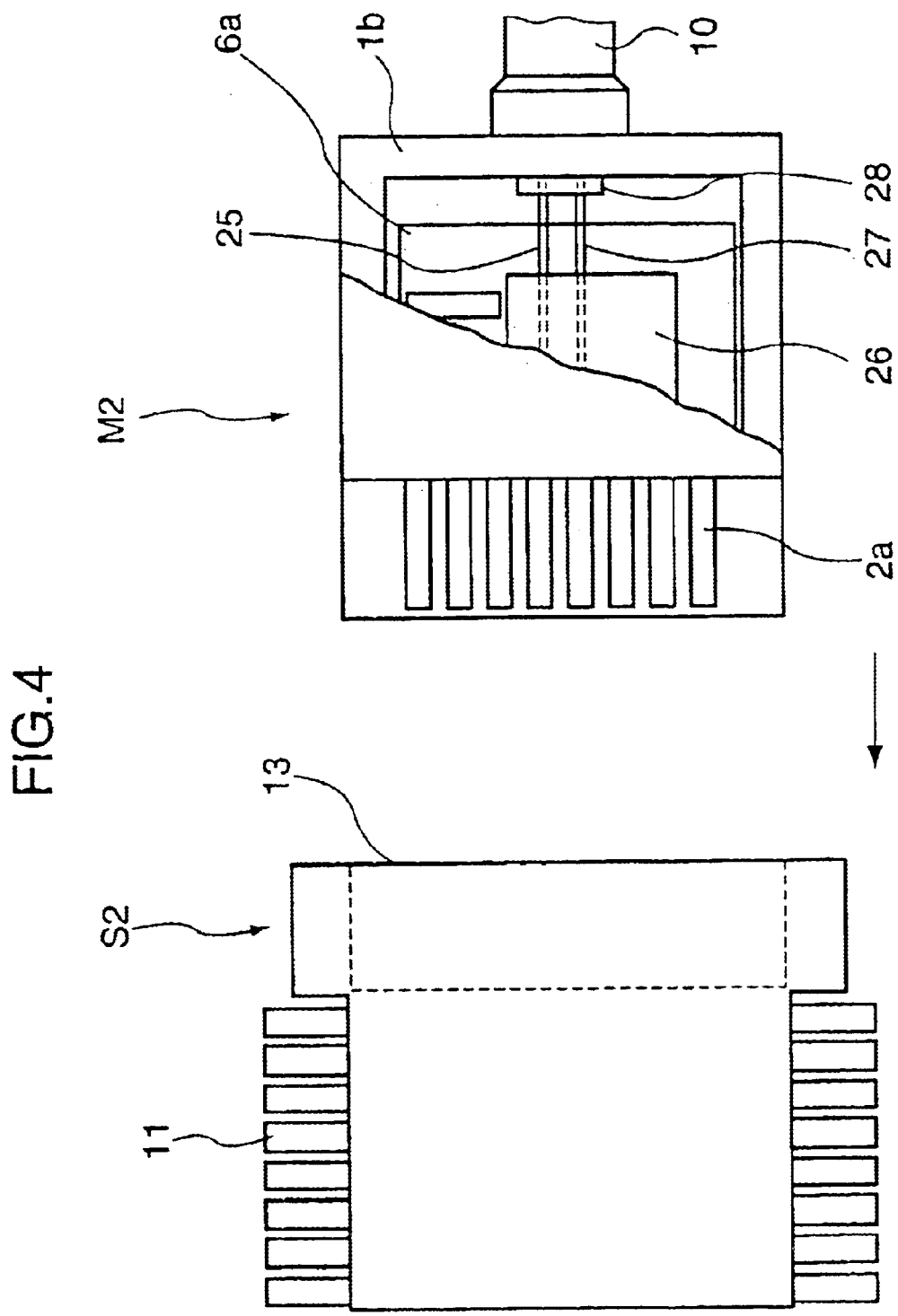

OPTICAL MODULE AND CONNECTING CONSTRUCTION FOR OPTICAL MODULE

BACKGROUND OF THE INVENTION

This invention relates to an optical module and a connecting construction for an optical module which are used mainly in an optical communication equipment or the like.

Conventional optical modules can be roughly classified into those of pigtail type in which a module main body is provided with a pigtail cord which is connected with an external optical fiber cord by a connector, and those of receptacle type in which an external optical fiber cord is directly connected with an adapter of a module main body.

In the optical modules of pigtail type, an optical fiber having a covering portion is present in the module and this covering portion not resistant to heat may be deteriorated. Accordingly, it is difficult to mount the optical module together with other parts on an electric circuit board in one step by reflow soldering. For this reason, the following manufacturing operations have been conventionally carried out. Heat-resistant parts are mounted on an electric circuit board by reflow soldering. Thereafter, an optical module is manually assembled over the electric circuit board. Such assembling operation is very cumbersome if a multitude of optical modules are necessary.

Further, with optical modules of receptacle type, it is difficult to arrange external optical fiber cord connected with an optical module in vicinity of a light emitting element, thereby necessitating an optical part such as a lens. This disadvantageously stands as a hindrance to miniaturization.

A connecting construction for an optical module as shown in FIG. 8 is known as a construction to avoid the above problems. An optical module J1 is constructed such that an optical element (semiconductor laser diode) 63 and a short optical fiber 64 having one end optically coupled to the optical element 63 are arranged on a substrate 62 accommodated in a package 61 and a sleeve 65 accommodating an unillustrated ferrule mounted on an other end of the short optical fiber 64 is arranged at one end of the package 61. The optical module 31 and an optical fiber cord K1 are optically coupled by inserting a ferrule 67 provided at an end of the optical fiber cord K1 into the sleeve 65 of the optical module J1 (see Japanese Patent No. 2654538, for example).

In the above connecting construction, the optical module J1 and the optical fiber cord K1 are constructed separately from each other. Accordingly, if the circuit board with the optical fiber cord K1 detached is caused to go through reflow soldering or the like, and then the optical fiber cord K1 is mounted on an electrical circuit board when the optical module J1 and the optical fiber cord K1 are mounted on the circuit board, the optical fiber cord K1 not resistant to heat can be mounted on the circuit board without being exposed to a reflow furnace.

On the other hand, a card type optical data link J2 as shown in FIG. 9 has been proposed to reduce the height of a PC card slot of a personal computer (see Japanese Unexamined Patent Publication No. 7-225327, for example). This link J2 is such that an optical module is mounted in a part of the PC card. A connector portion 71 of the optical data link J2 is connected with a connector portion 72 of a plug K2 accommodating optical fibers. The height of the connecting construction tries to be reduced by adopting such a construction.

However, the above optical module J1 has an optical connector construction by the ferrule accommodating the short fiber and the sleeve. There is a limit in miniaturizing the ferrule and the sleeve in order to ensure high precision and strength. Specifically, the thickness of the module cannot be reduced smaller than the diameter of a usually used ferrule, i.e., about 1.25 mm.

Further, even if miniaturization of the ferrules could be realized, the ferrules having a small diameter need to be abutted against each other. At this time, the very thin ferrules need to be inserted into a very small area without damaging the end faces thereof. Accordingly, it is extremely difficult to couple the optical fiber cords. For example, it should be done by using a special jig.

There is also needed a biasing construction for pushing the ferrules against each other by a force of about 9.8 N in order to ensure a sufficient optical coupling. This requires a spare space on the circuit board. Particularly, a coil spring of about 5 mm is provided to produce a biasing force in order to establish a connection, which is called "physical contact". The provision of a spring makes a space having a dimension of about 10 to 20 mm along the axial direction of the fiber inevitable, which hinders miniaturization.

Since dirt or the like may attach to an end of an optical fiber during, reflowing, a superfluous member such as a protection cover is required, causing a cumbersome handling and an unnecessary cost.

In the connecting construction shown in FIG. 9 as well, the thickness of the connector portion is restricted, which hinders reduction in the height of the optical data link.

While the PC card is accommodated inside a main body of a laptop computer, a semiconductor laser which produces a large amount of heat is formed in a main body of the PC card. Accordingly, heat is produced inside the main body of the laptop computer. Further, a large amount of heat produced by other electric modules inside the main body of the laptop computer may adversely affect the semiconductor laser or like optical element which is not resistant to thermal change.

SUMMARY OF THE INVENTION

It is an object of the invention to provide an optical module and a connecting construction for an optical module which are free from the problems residing in the prior art.

It is another object of the invention to provide an optical module and a connecting construction for an optical module which enable secure and easy mounting on an electric circuit board, and has an excellent reliability.

According to an aspect of the invention, an optical module comprises a substrate; an electric connection terminal provided on the substrate; an optical element provided on the substrate, the optical element being connected with the electric connection terminal; and one end of a slender light transmitter fixed on the substrate and optically coupled with the optical element.

According to another aspect of the invention, an optical module comprises a substrate; an electric connection terminal provided on the substrate; a planer lightwave circuit provided on the substrate, the planer lightwave circuit being connected with the electric connection terminal; and an optical fiber partially provided on the substrate and optically coupled with the planer lightwave circuit.

According to still another aspect of the invention, a combination comprises a connector connectable with an electric circuit board and an optical module. The optical module is provided with a substrate; an electric connection terminal provided on the substrate, the electric connection terminal electrically connectable with the connector; an optical element provided on the substrate, the optical element being connected with the electric connection terminal; and one end of a slender light transmitter fixed on the substrate and optically coupled with the optical element.

With these construction, it may be possible to first mount the connector on an electric circuit board, and thereafter mount the optical module having the light transmitter or optical fiber. Accordingly, the optical module can be mounted on the electric circuit board without the heat-vulnerable light transmitter or optical fiber being subject to the high temperature circumstance. Thus, the optical module can be mounted on an electric circuit board more accurately and easily, which consequently assures highly reliable performance.

These and other objects, features and advantages of the present invention will become more apparent upon a reading of the following detailed description and accompanying drawings.

BRIEF DESCRIPTION OF THE DRAWINGS

FIG. 4 is a plan view partially in section showing connection of an optical module and a socket according to another embodiment of the invention;

DETAILED DESCRIPTION OF THE PREFERRED EMBODIMENTS OF THE INVENTION

Figure 1A:
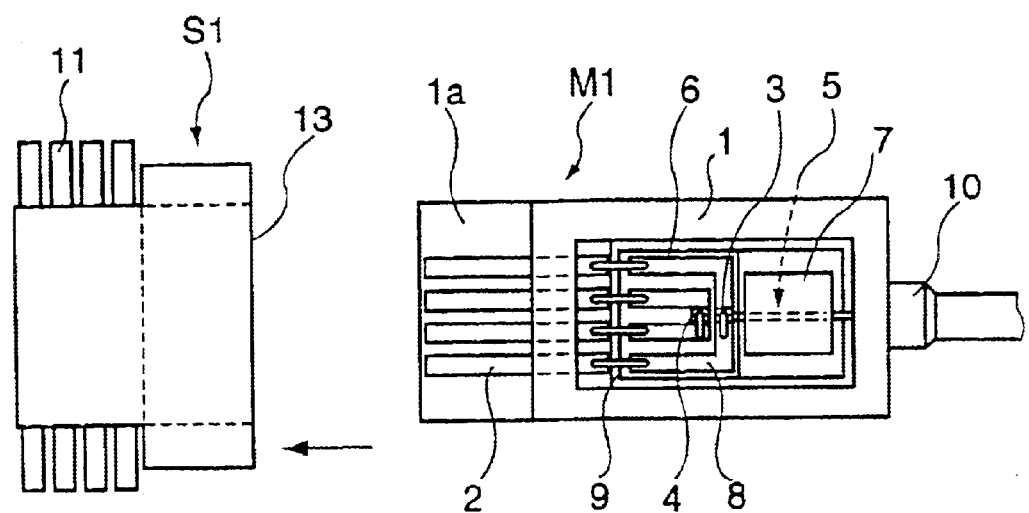
FIG. 1A is a plan view showing connection of an optical module and a socket according to an embodiment of the invention, a lid of the optical module being removed.
Figure 1B:
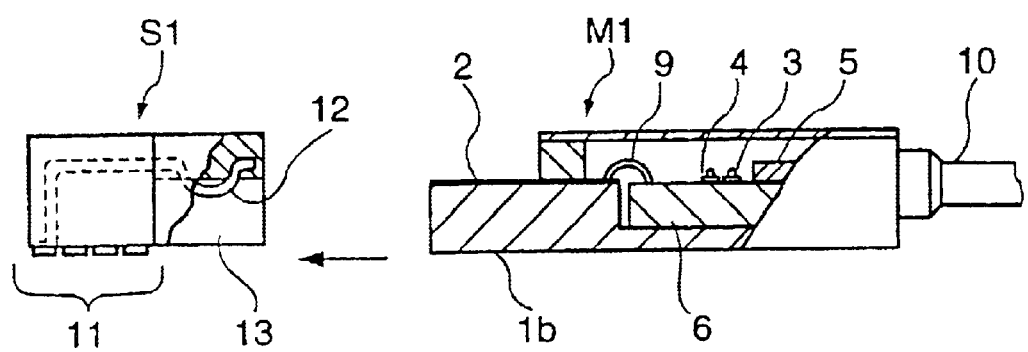
FIG. 1B is a side view of the optical module and the socket shown in FIG. 1A, partially showing their respective internal constructions.

FIGS. 1A and 1B show a card type optical module M1 and a socket S1 for connecting the optical module M1. A lid provided on a top surface of the optical module M1 is not shown in FIG. 1A, and the optical module M1 and the socket S1 which serves as a connector portion are shown partly in section in FIG. 1B. It is assumed that the socket S1 is mounted on a circuit board.

The optical module M1 is fabricated as follows: connection terminals 2 formed of copper wires are provided at one end 1a of a package 1 which is a flat base made of ceramic or like material, and optical elements connected with the connection terminals 2. The optical elements include a light emitting element 3 such as a semiconductor laser, a light receiving element 4 such as a photodiode for monitoring the light emitting element 3, and an optical fiber 5 serving as slender light transmitter having one end optically coupled to the light emitting element 3. They are arranged on a substrate 6. Further, an optical fiber cord 10 formed by covering the optical fiber 5 by a resin layer is connected with the other end of the optical fiber 5. In other words, at least one end of the optical fiber 5 is arranged in the package 1.

A V-shaped groove for mounting the optical fiber 5 is formed in a main surface of the substrate 6 with high precision by anisotropic etching. The optical fiber 5 is accurately positioned in this V-shaped groove, and a pressing plate 7 is provided above the V-shaped groove so as to prevent the optical fiber 5 from moving. Accordingly, the light emitting element 3 and the optical fiber 5 can be optically coupled with high precision. Further, electrode pads 8 drawn from the light emitting element 3 and the light receiving element 4 are formed on the main surface of the substrate 6. The thus formed substrate 6 is provided in the package 1, and the electrode pads 8 formed on the substrate 6 are connected to the connection terminals 2 by bonding wires 9.

On the other hand, in the socket S1 having mount terminals 11 used to surface-mount the socket S1 on the circuit board, connection terminals 12 connected with the mount terminals 11 and made of a metal such as stainless steel or bronze phosphor into the form of a leaf spring extend to a space 13 having a front insertion opening. The one end 1a, which is thin, of the optical module M1 is inserted into the opening 13 of the socket S1 to connect the connection terminals 2 of the optical module M1 and the connection terminals 12 of the socket S1. This arrangement enables driving of the optical elements.

Next, a manner of mounting the socket S1 and the optical module M1 on the electric circuit board is described. First, the socket S1 is connected onto the electric circuit board by reflow soldering or the like using the mount terminals 11. The socket S1 is exposed to a high temperature of 200° C. to 300° C. since SnPb solder is normally used to fix the socket S1 to the electric circuit board in a reflowing furnace. Since a coating of the optical fiber cord 10 connected with the optical module M1 is deteriorated at a temperature exceeding 100° C., the optical module M1 cannot be permitted to pass through the ref lowing furnace in the state where it is connected with the socket S1. For this reason, the optical module M1 is detached from the socket S1, and only the socket S1 is mounted on the electric circuit board. Accordingly, the optical fiber cord 10 is not exposed to a high-temperature atmosphere.

After the socket S1 is secured on the electric circuit board by being passed through the reflowing furnace, the optical module M1 is mounted on the electric circuit board by inserting the one end 1a of the optical module M1 into the socket S1 mounted on the electric circuit board. With the optical module M1 inserted in the socket S1, the optical module M1 is held between the electric circuit board and the socket S1 and a package bottom surface 1b of the optical module M1 comes into contact with the electric circuit board. Consequently, the optical module M1 is firmly fixed.

As described above, according to the connecting construction for the optical module M1, the optical fiber cord not resistant to heat is not be exposed to a high-temperature atmosphere when the thin optical module is mounted on the electric circuit board by reflow soldering. With the conventional optical modules, optical connectors have been used to attach and detach optical fiber cords. Thus, it has been difficult to miniaturize the prior art optical module because structural members such as ferrules and sleeves are used. Since the optical fiber cord is electrically connected in this embodiment unlike those conventional optical modules, space saving can be easily realized and the optical module itself can be fabricated in smaller size.

Further, the optical module M1 and the socket S1 need not be pressed against each other to ensure an electrical contact therebetween. This obviates the need for a coil spring or the like member which requires a large space, consequently making it possible to produce a miniaturized module and socket easily. When the optical module is attached and detached, no consideration needs to be taken for the protection of the end face unlike the conventional optical connector. This provides a satisfactory operability. Further, in the case of using an optical connector whose performance is considerably reduced if small dirt is attached thereto, a cover needs to be mounted to protect dirt from attaching to the end face of the optical connector while passing through the ref lowing furnace. Such a consideration is absolutely unnecessary for the inventive connecting construction by electrical contact.

Furthermore, the socket S1 is formed with the space 13 for receiving the optical module M1. The space 13 is opened at the front of the socket 1 that faces the optical module M1 and at the bottom of the socket S1 that faces the electric circuit board. This makes it possible to produce the socket S1 more easily. Also, the socket S1 has an enhanced heat dissipation.

It may be appreciated to provide a driver element for driving the optical elements (i.e., the light emitting element 3 and the light receiving element 4) in the socket S1. It has been known that a driver element for driving an optical element generally generates a greater heat, and optical elements are highly influenced by temperature variation as mentioned earlier. Comparing with the conventional optical module provided with optical elements and a driver element for them, accordingly, the inventive construction of providing optical elements and an optical element driver element separately is advantageous in the performance stabilization of optical element.

Also, it may be appreciated to make the socket S1 by a material having a higher thermal conductivity than a material constituting the optical module M1. Specifically, the main body of the socket S1 for holding the connection terminal 12 is made of a material having a higher thermal conductivity than the substrate of the optical module M1 or the package 1 to keep the heat of the driver element from transmitting to the optical module from the socket S1. For example, the substrate of the optical module M1 is made of such ceramics as alumina or resin to have a thermal conductivity of 50 W/mk or lower. On the other hand, the main body of the socket S1 is made of a metal (e.g., Cu—W, stainless) or such ceramics as aluminum nitride to have a thermal conductivity of 100 to 400 W/mk. This construction causes most of the heat generated by the driver element in the socket S1 not to transmit to the optical module M1 but to the electric circuit board connected with the socket S1. Accordingly, the optical elements in the optical module M1 is little subject to the heat of the driver element.

It has been known that an optical element (particularly, semiconductor leaser) and a driver element for driving the optical element are significant elements for the performance (particularly, operation speed or frequency) of an optical module. However, it is not easy to match them to attain best performance. For example, there is likely to occur an occasion that an optical element having a high performance (e.g., 10 GBPS) is combined with a driver circuit having a lower performance (e.g., 2.5 GBPS). In this case, the performance of the combination incomes to the lower performance or 2.5 GBPS. Against this drawback, the inventive construction is advantageous because of the provision of optical elements and driver element in the separable parts. Specifically, the optical module M1 and the socket S1 carrying the driver element can be individually replaced with a higher performable one. In the above-mentioned example, the socket carrying the driver circuit having the lower performance of 2.5 GBPS will be replaced with a socket carrying a driver element having a higher performable socket having a high performance of 10 GBPS when the high performable socket is available, thereby raising the performance of the optical module to the high performance of 10 GBPS. In other words, a part having a lower performance or other drawback can be separably replaced with a better one. Thus, the performance of an entire system can be raised more easily.

In optical modules capable of transmitting a large amount of data or having a high transmission frequency, there is the likelihood that an optical element provided in the optical module is influenced by external noises to lower the performance of the optical module. For example, an optical element for converting an electric signal to an optical signal receives a noticeable magnitude of electromagnetic wave, consequently generating an unnecessary signal to cause a maloperiation. A drive circuit which is located near the optical element is likely to generate such undesirable electromagnetic wave. However, the inventive construction of providing optical elements and driver element in the separable parts enable shielding of optical elements and driver element individually to prevent the optical elements from being subject to noises or electromagnetic wave generated by a drive circuit. Thus, the performance of the optical module can be assuredly raised.

Next, another embodiments of the invention will be described. It should be noted that detailed description of the same or similar parts as those of FIGS. 1A and 1B is omitted.

Figure 2:
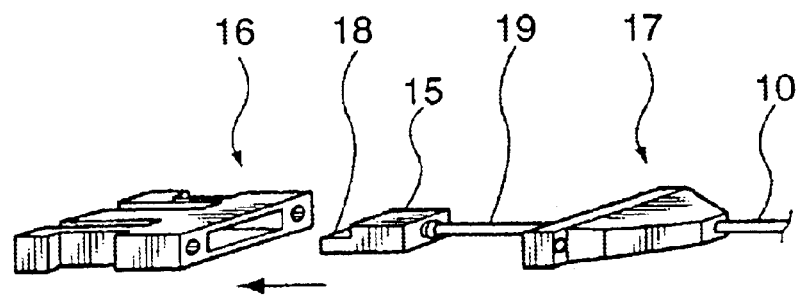
FIG. 2 is an exploded perspective view showing an optical fiber connector.

In FIG. 2, an optical module main body 15 having the construction shown in FIGS. 1A and 1B is inserted into a holder 16 for holding and locking the optical module main body 15 in the direction of arrow, and is further held by a presser 17 so as not to come out of the holder 16. A connection terminal (connection electrode) 18 of the optical module main body 15 is exposed to a connection side of the holder 16. Let an assembly in which the optical module main body 15 is enclosed in the presser 17 for locking at an end of an optical fiber cord 19 and the connection terminal 18 is electrically connectable with an external device by the holder 16 be called "optical fiber connectors".

The inventive optical module main body 15 can be formed thin using a monocrystalline silicon substrate. For instance, the silicon substrate shorter than 1 mm is sufficient, and the entire optical module including a package can be about 2 to 3 mm in thickness. Further, since the holder 16 can be formed of resin or the like to have a thickness of about 0.5 mm, the thickness of the optical fiber connector can be about 5 mm or smaller.

Figure 3:
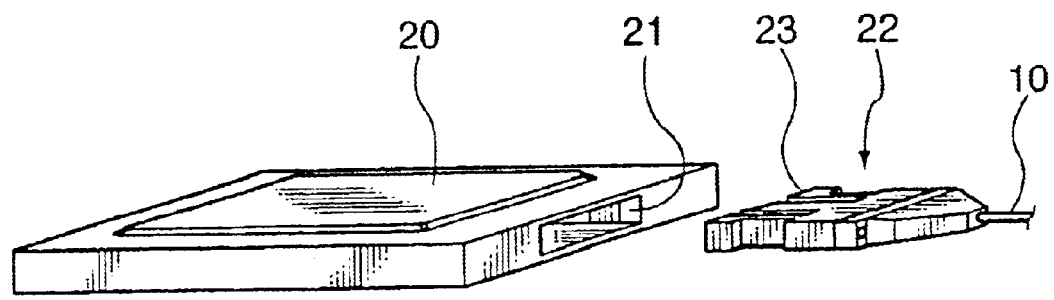
FIG. 3 is a perspective view showing a state where the optical fiber connector is connected with a PC card for data link.

This optical fiber connector can be connected with a PC card 20 for data link, for example, as shown in FIG. 3. Specifically, an illustrated socket is arranged in vicinity of a connection opening 21 of the PC card 20 for data link. The connection electrode of the optical fiber connector 22 having the construction described with reference to FIG. 2 is inserted into the socket to establish an electrical connection and locked and held in the opening 21 of the PC card 20 by a locking construction 23 formed in the optical fiber connector 22.

Figure 9:
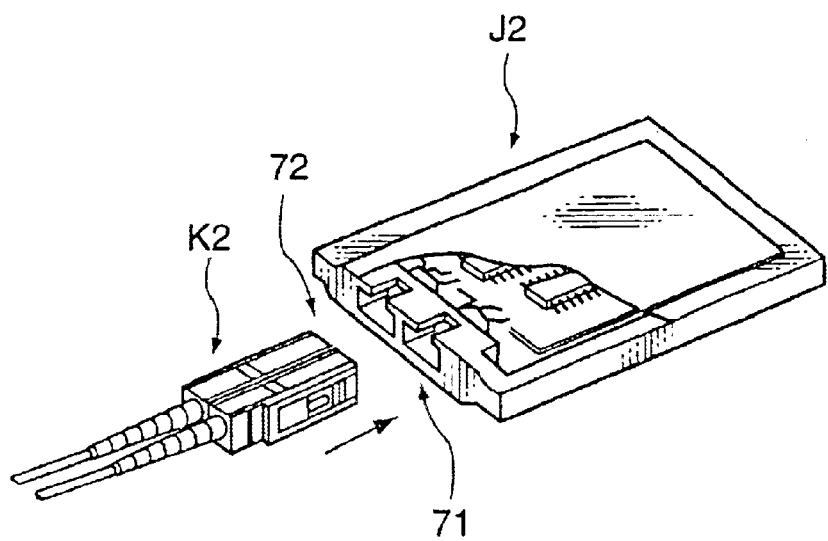
FIG. 9 is a perspective view showing a conventional PC card type optical module connection.

The PC card 20 called Type II by the standards has a thickness of 5 mm. In the case that a conventional optical connector is used, it is impossible to thin it due to the use of structural parts such as ferrules. The thickness of the conventional optical module shown in FIG. 9 can only be reduced to as small as 5 mm by omitting some parts of the PC card. However, it is known that optical connections are very unstable if there is provided no sufficient locking force. In the conventional connection shown in FIG. 9, it is difficult to securely obtain a sufficient optical connection since some parts of the locking construction are omitted. By using the optical fiber connector 22 according to this embodiment, designing of the optical module with sufficient margins is enabled even if thickness is 5 mm or smaller. Thus,this optical fiber connector can provide a function necessary and sufficient as a connector for PC card in data communication using optical fibers.

The PC card 20 is accommodated in main body of a laptop computer. In the conventional optical module shown in FIG. 9, the main body of the laptop computer is heated by a large amount of heat which is generated by light emitting elements or the like provided in the main body of the laptop computer. Further, heat produced in large quantity by other electric modules may influence optical elements not resistant to thermal change in the main body of the laptop computer.

On the other hand, since the inventive optical fiber connector 22 is provided outside the main body of the laptop computer together with the optical fiber, the generated heat escapes to the outside. Also, the optical module in the connector is not subject to heat from the main body of the laptop computer. Further, the socket is mounted on the PC card by ref lowing or other like in the same way as being mounted on an electric circuit board. This will improve the production efficiency of PC cards.

Next will be described an example in which an inventive optical module is applied as a transmission/reception module. In FIG. 4. an optical module M2 having a construction similar to that shown in FIGS. 1A and 1B is used as a transmission/reception module. A socket S2 has also a similar construction to the socket shown in FIGS. 1A and 1B.

Specifically, a signal outputted from an external optical module or the like is inputted to a fiber 25 for reception, and sent to an planer lightwave circuit 26 connected with the reception fiber 25. An output from the planer lightwave circuit 26 is transmitted to the outside via an optical fiber 27 for transmission. By using a double-core tape fiber 28, the planer lightwave circuit 26, etc., the optical module which receives and transmits the signal in one step can also be fabricated in small size. The planer light wave circuit 26 is a circuit on which a slender light transmitter, various optical elements, other optical and electronic parts are integrated.

The planer lightwave circuit 26 is arranged on a substrate 6a (i.e., second base member) similar to the substrate 6 of the optical module M1 shown in FIGS. 1A and 1B. The substrate 6a (i.e., first base member) is mounted in a package 1b similar to the package 1 of the optical module M1. Connection terminals 2a similar to the connection terminals 2 of the optical module M1 are formed at one end of the package 1b. Further, the substrate 6a is formed with conductors for connecting the planer lightwave circuit 26 with the connection terminals 2a.

Figure 5A:
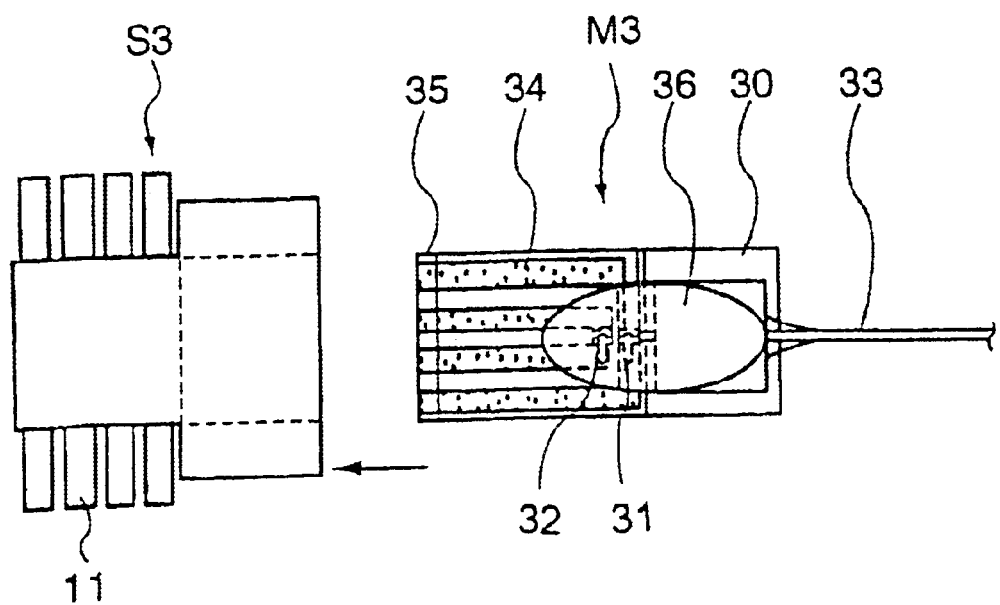
FIG. 5A is a plan view showing connection of an optical module and a socket according to still another embodiment of the invention.
Figure 5B:
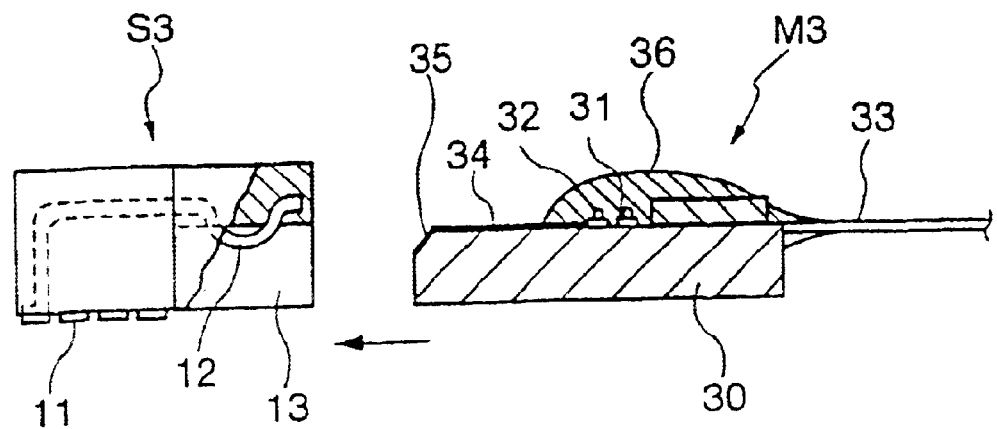
FIG. 5B is a partially sectional view of the optical module and the socket shown in FIG. 5B.

Next, another embodiment of the invention will be described with reference to FIGS. 5A and 5B. In an optical module M3, a light emitting element 31 and a light receiving element 32 are mounted on a plate-like substrate 30. The substrate 30 is formed with a V-shaped groove precisely positioned. The light emitting element 31 and an optical fiber 33 are optically coupled by arranging the optical fiber 33 in the V-shaped groove. Further, electrode pads 34 drawn from the light emitting element 31 and the light receiving element 32 are formed on the substrate 30. A slanted surface 35 is formed at the portion of the substrate 30 where ends of the electrode pads 34 are located. The light emitting element 31, the light receiving element 32, and the optical fiber 33 mounted on the substrate 30 are protected by a transparent resin 36. A socket S3 has a construction similar to the socket S1 shown in FIGS. 1A and 1B. The slanted surface 35 can eliminate the likelihood that the leading end of the electrode pads 34 is chipped by the connection terminal 12 of the socket S3 when being inserted into the socket S3.

In this way, the light emitting element 31 and the light receiving element 32 are protected by the transparent resin 34 or the like, and the electrode pads 34 formed on the substrate 30 used as an auxiliary mount in the optical module are used as connection terminals to establish an electrical connection. Thus, the entire optical module can be miniaturized. As a result, a portion which has been conventionally connected with a package by wire bonding or like means becomes unnecessary, and the fabrication process can be remarkably simplified.

Still another embodiment of the invention will be described with reference to FIG. 6. An optical module M4 of this embodiment is formed with electrode terminal 38 in a package 37 (first base member) made of ceramic, metal or plastic as to extend from its inner side 37a to its outer side 37b. Also, a light emitting element 40, a light receiving element 41, and an optical fiber 42 are arranged on an auxiliary mount 39 (second base member). The light emitting element 40 and the optical fiber 42 are positioned and optically coupled with each other. The optical fiber 42 is fixed by a pressing plate 43.

An electrode pad 44 is formed at one end of the auxiliary mount 39, and electrically connected with the light emitting element 40 and the light receiving element 41, respectively. The electrode pad 44 on the auxiliary mount 39, on which the light emitting and receiving elements 40 and 41 and the like are mounted, are electrically connected with the electrode terminals 38 formed on the package 37 by conductive adhesive, solder or like means. Since wire bonding conventionally used to establish an electrical connection is not used, the reflection and loss of an electric circuit can be reduced. This property is particularly satisfactory in the case of an optical module utilizing signals of high frequency. Further, since a larger contact area can be provided as compared with conventional wire bonding, the radiation characteristic is better, consequently reducing the influence of heat to the optical elements.

Figure 7:
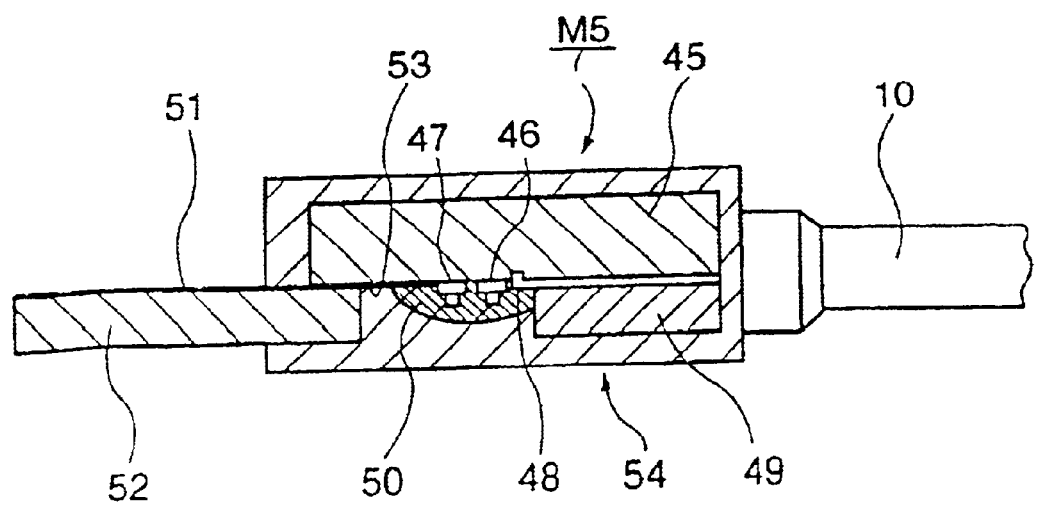
FIG. 7 is a partially sectional view showing an optical module according to still further embodiment of the invention.
Figure 8:
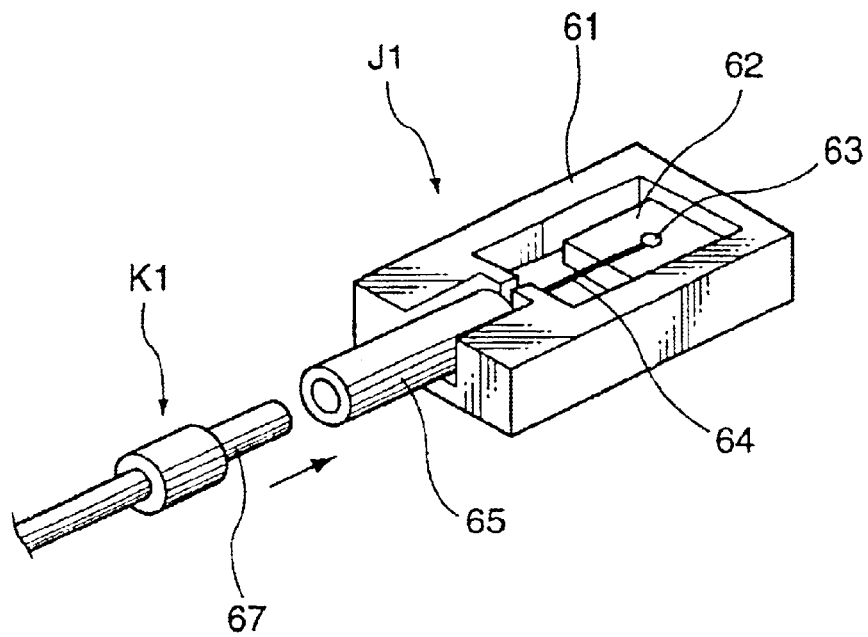
FIG. 8 is a perspective view showing a conventional optical module connection.

FIG. 7 shows an optical module according to further embodiment of the invention. An optical module M5 is provided with a light emitting element 46, light receiving element 47, optical fiber 48, pressing plate 49 and the like are mounted on an auxiliary mount 45 (second base member). The light emitting element 46 and the light receiving element 47 are protected by a transparent resin 50. Also, the optical module M5 is provided with a terminal board 52 (first base member) having electrode terminals 51 for connection is made of plastic, ceramic, glass, glass epoxy resin, or like material.

Figure 6:
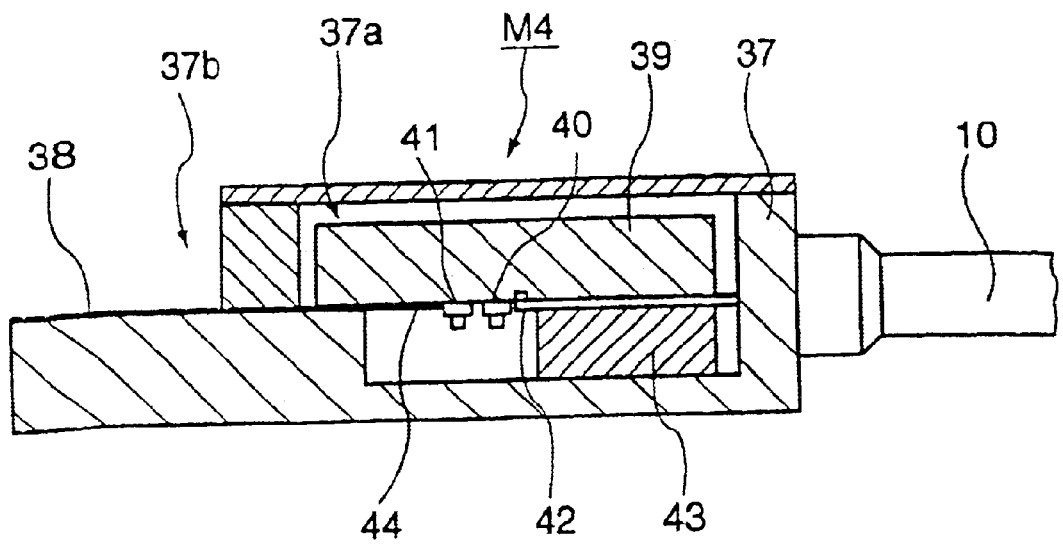
FIG. 6 is a partially sectional view showing an optical module according to further embodiment of the invention.

An electrode pad 53 is formed on the auxiliary mount 45, and is connected with the electrode terminal 51 on the terminal board 52 by a conductive adhesive, solder or like means in the same manner as the optical module shown in FIG. 6. The thus fabricated auxiliary mount 45 is enclosed by a package 54 by injection molding.

In the optical module M5, the terminal board 52 is separately formed. Thus, a material different from those of the package 54 and the auxiliary mount 45 can be selected to ensure strength for the terminal board 52. For instance, a highly rigid material (e.g., ceramics) may be selected, or alternatively a flexible material (e. g., soft polymer resin) may be selected to let stress escape by being deformed.

According to the inventive optical module and its connection construction, only a socket serving as connector can be mounted on an electrical circuit board by reflow soldering or like means, and an optical module having an optical fiber cord can be mounted at a later stage. This can keep the optical fiber cord from being exposed to a high-temperature atmosphere.

Further, it can be unnecessary to do the optical connection of optical elements over an electric circuit board that has conventionally required a high precision. Connection of an optical module with an electric circuit board can be realized by electrical contact which enables a sufficient signal transmission even in a small space. Therefore, not only the optical module but also the entire electric circuit board can be miniaturized and thinned.

In the conventional optical modules, there is the necessity of placing a cover over an optical connection portion to keep dirt or the like from attaching onto the optical connection portion when being passed through a reflowing furnace. This is a cumbersome operation. As compared to the conventional optical modules, the inventive optical module and connection construction are not influenced at all by dirt in the reflowing furnace. Thus, the inventive optical module can be more easily mounted on an electric circuit board.

Further, in the conventional optical connection, the end faces of the thin ferrules are abraded and a special care is taken to connect them so as not to be unnecessarily damaged or scratched when being abutted against each other. According to the inventive optical module and connection construction, connection of the optical module with an electric circuit board is realized by an electrical contact. Accordingly, the electrical contact can be established even if there are fine scratches in a contact surface, which enables signals to be transmitted without any problem or influence of scratches, thus assuring easier handling.

The assembling cost can be remarkably reduced by the passive alignment technique. Also, the size of optical module can be reduced by using a substrate having a small outer configuration, and a thin optical module, which can be very easily mounted, can be fabricated.

Further, the use of a silicon substrate, which can be highly precisely processed by the anisotropic etching technique, as a substrate for optical module makes it possible to embed an optical fiber, which further reduces the height of the optical module. More specifically, auxiliary mounts precisely made of ceramic or glass have been conventionally frequently used as a high precision auxiliary mount. Such substrates are made to have a thickness greater than a specified value in order to ensure a strength durable against processing. However, the processing by anisotropic etching, which is done in the foregoing embodiments, employs no mechanical processing. Accordingly, a force exerted on the substrate is small, and the outside dimension of the substrate can be made smaller. Thus, the optical module can be further thinned by using, as a base member, a silicon substrate to which anisotropic etching is applied.

Further, in the case that the inventive optical module is applied to a PC card of a personal computer, since the signal connection is made by an electric contact, a thin connector or socket can be used, thus reducing the height of the PC card considerably.

Furthermore, the socket used to connect the inventive optical module has its electric terminal connected to an electric circuit board by soldering or like means. Since no optical fiber cord is arranged yet at the stage of connecting the electric terminal to the electric circuit board, the socket can be mounted on the electric circuit board together with other electric devices by reflowing or the like. The optical module functions as such by connecting the optical module having the optical fiber cord with the socket after reflowing. The inventive optical module can be easily mounted on an electric circuit board. Also, the inventive connection construction assures excellent and reliable connection.

It should be appreciated that the foregoing embodiments are nothing but examples of the present invention. For example, light from a slender light transmitter such as an optical fiber may be optically coupled to a light receiving element as an optical element. Various changes and improvements can be made without departing from the scope and spirit of the invention.

As described above, an inventive optical module comprises a substrate, an electric connection terminal provided on the substrate, and an optical element provided on the substrate. The optical element is connected with the electric connection terminal. Further, there is provided one end of a slender light transmitter fixed on the substrate and optically coupled with the optical element.

Also, an inventive optical module is constructed by a substrate which are provided with an electric connection terminal provided, a planer lightwave circuit, and an optical fiber. The planer lightwave circuit is connected with the electric connection terminal. The optical fiber partially provided on the substrate and optically coupled with the planer lightwave circuit.

Further, an inventive combination comprises a connector connectable with an electric circuit board, and an optical module including a substrate, an electric connection terminal provided on the substrate, the electric connection terminal electrically connectable with the connector, an optical element provided on the substrate, the optical element being connected with the electric connection terminal, and one end of a slender light transmitter fixed on the substrate and optically coupled with the optical element.

These constructions make it possible to first mount only the connector on an electric circuit board by reflow soldering or the like means, and thereafter mount the optical module having the slender light transmitter or optical fiber. Accordingly, the optical module can be mounted on an electric circuit board without the heat-vulnerable light transmitter or optical fiber being subject to the high temperature circumstance. The optical module can be mounted on an electric circuit board more easily and accurately. Thus, the optical module will ensure highly reliable performance.

The substrate may be constructed by a first base member and a second base member. The first base member is provided with the electric connection terminal, and the second base member is provided with the optical element or planer lightwave circuit, and the slender light transmitter or optical fiber. With this construction, the first base member carrying the electric connection terminal and the second base member carrying the optical element and light transmitter can be individually fabricated, and are united into one body. Accordingly, the optical module can be produced at a higher efficiency.

The second base member may be mounted on the first base member. The two members can be positioned to each other more easily and accurately.

There may be provided a protector on the substrate for protecting the optical element and the slender light transmitter. The protector keeps the optical element and light transmitter from the air, consequently enhancing the reliability of operation.

The electric connection terminal may be provided at a leading end of the substrate or the first base member. The connector may be formed with a reception space for receiving the leading end of the substrate or the first base member. Also, the connector may be provided with an electric connection terminal connectable with the electric connection terminal on the substrate or the first base member when the leading end of the substrate or the first base member is placed in the reception space. With this construction, the optical module, can be firmly held by the connector, thereby raising the connection reliability.

The reception space may be opened to the electric circuit board. The electric connection terminal provided in the connector may be provided with a spring force, and exposed to the reception space. This construction can ensure more increased connection reliability.

A main body of the connector may be made of a material having a thermal conductivity higher than the substrate or the first base member. This construction can prevent the heat generated in the connector from transmitting to the optical module more effectively, thus assuring an enhanced operation reliability.

This application is based on patent application No. 11-183264 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An optical module comprising:
   a substrate having a planar main surface and a groove in the main surface of the substrate;
   an electric connection terminal provided on the substrate;
   an optical element comnpletely provided on the planar main surface of the substrate, the optical element being electrically connected with the electric connection terminal,
   wherein the optical element is mounted on the planar main surface of the substrate, and the substrate has a coupling portion to be coupled with a connector through which the optical element is electrically connected with an electric circuit board; and
   one end of a slender light transmitter fixed in the groove and optically coupled with the optical element,
   wherein the light transmitter immediately adjacent to the optical element is fixed in the groove.

2. The optical module according to claim 1, wherein the substrate includes a first base member and a second base member, the first base member being provided with the electric connection terminal, and the second base member having the planar main surface and being provided with the optical element and the slender light transmitter.

3. The optical module according to claim 2, wherein the second base member is mounted on the first base member.

4. The optical module according to claim 1, further comprising a protector formed on the substrate for protecting the optical element and the slender light transmitter.

5. An optical module comprising:
   a substrate having a planar main surface and a groove in the main surface of the substrate;
   an electric connection terminal provided on the substrate;
   a planer lightwave circuit completely provided on the main surface of the substrate, the planer lightwave circuit being electrically connected with the electric connection terminal,
   wherein the planer lightwave circuit is mounted on the planar main surface of the substrate; and
   an optical fiber parting provided in the groove and optical coupled with the planer lightwave circuit,
   wherein the optical fiber immediately adjacent to the planer lightwave circuit is fixed in the groove, and the substate has a coupling portion to be coupled with a connector through which the planar lightwave circuit is electrically connected with an electric circuit board.

6. The optical module according to claim 5, wherein the substrate including a first base member and a second base member, the first base member being provided with the electric connection terminal, and the second base member being provided with the planar lightwave circuit and the optical fiber.

7. A combination comprising:
   a connector including a receptacle, a module connection terminal, and a circuit board connection terminal electrically connected with the module connection terminal and connectable with an electric circuit board; and
   an optical module including:
   a substrate having a planar main surface, a groove in the main spice of the substrate, and a coupling portion to be received in the receptacle of the connector for the coupling of the connector and the optical module;
   an electric connection terminal provided on the substrate, at such a position to be electrically connected with the module connection terminal of the connector when the coupling portion of the substrate is received in the receptacle;
   an optical element completely provided on the main surface of the substrate, the optical element being connected with the electric connection terminal,
   wherein the optical element is mounted on the planar main surface of the substrate; and
   one end of a slender light transmitter fixed in the groove and optically coupled with the optical element,
   wherein the light transmitter immediately adjacent to the optical element is fixed in the groove.

8. The combination according, to claim 7, wherein the substrate includes a first base member and a second base member, the first base member being provided with the mode connection terminal, and the second base member being provided with the optical element and the slender light transmitter.

9. The combination according to claim 8, wherein:
the module connection terminal is provided at a leading end of the first base member which serves as the coupling portion; and
the connector is formed with a reception space which serves as the receptacle, and the circuit board connection terminal is adapted to be connected with an electric circuit board by soldering.

10. A combination according to claim 9, wherein the receptacle is opened to the electric circuit board.

11. A combination according to claim 10, wherein the module connection terminal of the connector has a form of a spring and is exposed to the receptacle.

12. A combination according to claim 8, wherein a main body of the connector is made of a material having a thermal conductivity higher than that of the first base member.

13. A combination according to claim 7, wherein the optical module is further provided with a protector on the substrate for protecting the optical element and the slender light transmitter.

14. A combination according to claim 7, wherein a main body of the connector is made of a material having a thermal conductivity higher than the substrate.

15. An optical module comprising:
a package casing provided with an electric terminal on a surface thereof, the package casing having a mount space;
a substrate having a planar main surface and a groove in the main surface of the substrate, bearing an optical element, an electrode drawn from the optical element, and one and of a slender light transmitter, the optical element and the one end of the slender light transmitter being fixedly attached on the substrate and optically coupled with each other, the substrate being placed in the mount space of the package casing;
wherein the one end of the slender light transmitter is fixed in the groove,
wherein the light transmitter immediately adjacent to the optical element is fixed in the groove; and
a bonding member which connects the electric terminal of the package casing and the electrode pad on the substrate, the electric terminal being adapted to be electrically connected with an external circuit through a connector, wherein the substrate has a coupling portion coupled to the connector.

16. The optical module according to claim 15, further comprising a protector formed on the substrate for protecting the optical element and the one end of the slender light transmitter.

17. The optical module according to claim 15, wherein the package casing is made of ceramic.

18. An optical module comprising:
a package casing provided with an electric terminal on a surface thereof, the package casing having a mount space;
a substrate having a planar main surface and a groove in the main surface of the substrate, bearing a planer lightwave circuit and one end of an optical fiber which are fixedly attached on the substrate and optically coupled with each other, the substrate being placed in the mount space of the package casing;
wherein the one end of the optical fiber is fixed in the groove,
wherein the optical fiber immediately adjacent to the lightwave circuit is fixed in the groove; and
a bonding member which connects the electric terminal of the package casing and the planer lightwave circuit, the electric terminal being adapted to be electrically connected with an external circuit through a connector, wherein the substrate has a coupling portion coupled to the connector.

19. The optical module according to claim 18, wherein the package casing is made of ceramic.

20. A combination comprising:
a connector including a receptacle, a module connection terminal, and a circuit board connection terminal electrically connected with the module connection terminal and connectable with an electric circuit board; and
an optical module including:
a package casing having a coupling portion to be received in the receptacle for the coupling of the connector and the optical module, and provided with an electric terminal on a surface of the coupling portion to be connected with the module connection terminal of the connector when the coupling portion is received in the receptacle, the package casing having a mount space;
a substrate having a planar main surface and a groove in the main surface of the substrate, bearing an optical element, an electrode drawn from the optical element, and one end of a slender light transmitter, the optical element and the one end of the slender light transmitter being fixedly attached on the substrate, and optically coupled with each other, the substrate being placed in the mount space of the package casing;
wherein the one end of the slender light transmitter is fixed in the groove,
wherein the light transmitter immediately adjacent to the optical element is fixed in the groove; and
a bonding member which connects the electric terminal of the package casing and the electrode pad on the substrate, where in the substrate has a coupling portion coupled to a connector.

21. The combination according to claim 20, wherein the reception space is opened to the electric circuit board.

22. The combination according to claim 21, wherein the module connection terminal provided in the connector has the form of a spring and is exposed to the receptacle.

23. The combination according to claim 20, wherein a main body of the connector is made of a material having a thermal conductivity higher than the first base member.

24. The optical module according to claim 20, wherein the package casing is made of ceramic.

* * * * *